United States Patent [19]

Meyer et al.

[11] 3,910,917
[45] Oct. 7, 1975

[54] 1-OXO-HEXAHYDROACRIDINES

[75] Inventors: Horst Meyer; Friedrich Bossert, both of Wuppertal; Wulf Vater, Opladen; Kurt Stoepel, Wuppertal, all of Germany

[73] Assignee: Bayer Aktiengesellschaft, Germany

[22] Filed: Feb. 25, 1974

[21] Appl. No.: 445,167

[30] Foreign Application Priority Data
Mar. 3, 1973 Germany............................ 2310746

[52] U.S. Cl....... 260/279 R; 260/287 R; 260/289 R; 424/257; 424/258
[51] Int. Cl.² .............. C07D 491/04; C07D 219/06; C07D 215/16; A61K 31/435
[58] Field of Search ................................ 260/279 R

[56] References Cited
OTHER PUBLICATIONS

Cromwell et al., J. Am. Chem. Soc., Vol. 82, pp. 2046–2050 (1960).
Stetter et al., Chemical Abstracts, Vol. 49 14681 i (1955).
J. Heterocyclic Chemistry, V. 4(4) pp. 565–570 (1967).

*Primary Examiner*—Donald G. Daus
*Assistant Examiner*—Diana G. Rivers

[57] ABSTRACT

1,4-Dihydroquinoline derivatives of the formula:

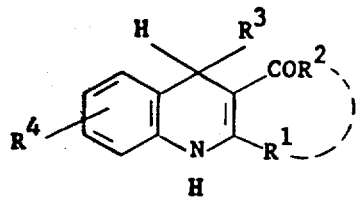

as described below are particularly useful for their antihypertensive effect and their coronary dilating effect.

8 Claims, No Drawings

1-OXO-HEXAHYDROACRIDINES

The present invention relates to 1,4-dihydroquinoline derivatives, to a process for their production, to pharmaceutical compositions wherein said compounds are the active agents, and to methods of treating hypertension and effecting coronary dilation in humans and animals which comprises administering such compounds to said humans and animals.

It is known in the art that the reaction of anthranilic acid with a β-dicarbonyl compound yields a 4-hydroxyquinoline:

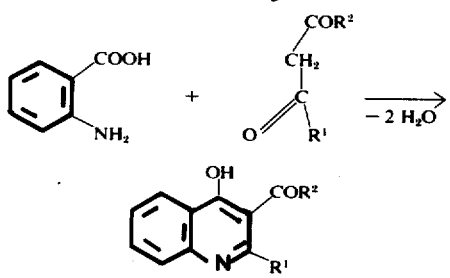

in which $R^1$ and $R^2$ are radicals that take no part in the reaction (S. v. Niementowski, Ber. dtsch. chem. Ges. 27, 1394 (1894)).

The reaction of 2-aminobenzaldehyde and a β-dicarbonyl compound to give a quinoline is also described in the literature:

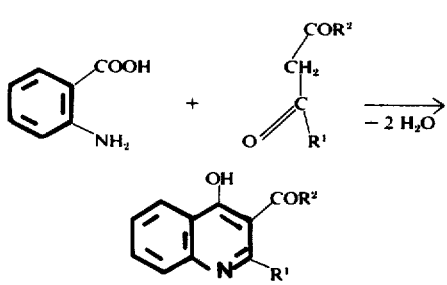

in which $R^1$ and $R^2$ are radicals that take no part in the reaction (P. Friedländer, Ber. dtsch. chem. ges. 15, 2572 (1892)).

The Hantzsch pyridine synthesis (compare U. Eisner and J. Kuthan, Chem. Rev. 72, 1, (1972)), which is suitable for the preparation of 1,4-dihydropyridines, cannot be used for the preparation of 1,4-dihydroquinolines. 1,4-dihydroquinolines without Grignard-active substituents can be prepared by reaction of quinolines with a Grignard compound. (R. C. Fuson, H. L. Jackson and E. W. Grieshaber, J. Org. Chem. 16, 1529 (1951)).

More specifically the present invention is concerned with 1,4-dihydroquinoline derivatives of the formula:

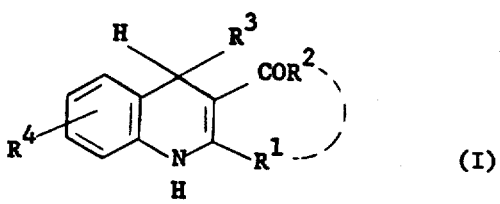

wherein $R^1$ is straight or branched chain alkyl of 1 to 4 carbon atoms;

$R^2$ is straight or branched chain alkyl of 1 to 4 carbon atoms; or —OR' wherein R' is straight or branched chain alkyl of 1 to 4 carbon atoms, straight or branched chain alkenyl of 2 to 4 carbon atoms, straight or branched chain alkyl of 1 to 4 carbon atoms interrupted by oxygen or straight or branched chain alkenyl of 2 to 4 carbon atoms interrupted by oxygen; or $R^1$ and $R^2$ are linked together to form a ring system having 5 to 10 carbon atoms or a ring system having 10 carbon atoms and additionally having an oxygen atom in the ring wherein said 5 to 10 carbon atoms include the 2 carbon atoms of the pyridyl moiety and the carbon atoms of the carbonyl group attached to $R^2$;

$R^3$ is monoaryl unsubstituted or substituted by one or more substituents, especially 1 or 2 substituents, selected from the group consisting of alkyl of 1 to 4 carbon atoms, alkoxy of 1 to 4 carbon atoms, phenyl, halogen, nitro, cyano, trifluoromethyl, and alkylmercapto of 1 to 4 carbon atoms in the alkyl moiety; naphthyl; thenyl; or furyl; and $R^4$ is hydrogen, halogen, alkyl or 1 to 4 carbon atoms, or alkoxy of 1 to 4 carbon atoms.

The 1,4-dihydroquinoline derivatives described above are advantageously produced by reacting a 2-aminobenzyl alcohol of the formula:

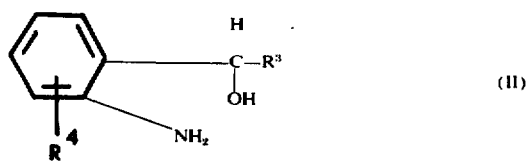

wherein $R^3$ and $R^4$ are as above defined, with a β-dicarbonyl compound of the formula:

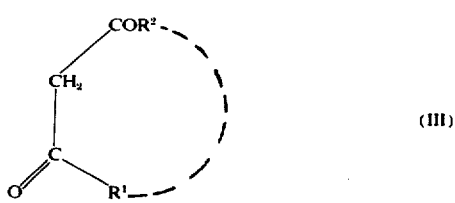

wherein $R^1$ and $R^2$ are as above defined, in the presence of an inert organic solvent at a temperature of from about 20°C to about 200°C.

The compounds of the present invention are particularly useful for their antihypertensive effects and for their coronary dilating effects.

The above process for the production of these new compounds represents a substantial advance in the art. Not only are the compounds of the present invention produced in good yields and high purity but the process would in the light of the art not have been expected to produce the compounds in any reasonable yields and in any satisfactory degree of purity. From the state of the art, it would be wholly unexpected that an aminobenzyl alcohol of formula II above would react with a β-dicarbonyl compound of formula III above to give a bicyclic compound of the formula I above. According to the art, alkylations of β-dicarbonyl compounds with alcohols, which are assumed to be the primary step in the above process

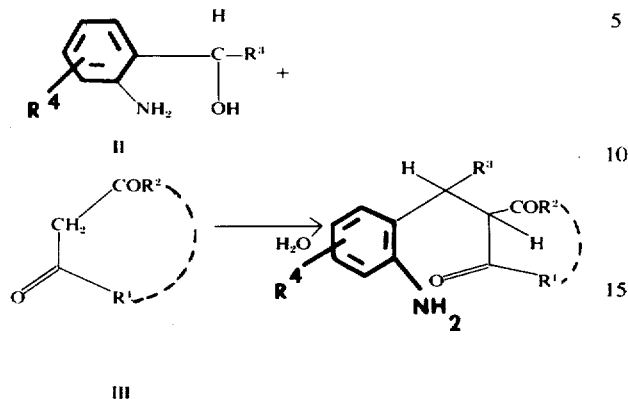

are only possible using boron trifluoride as a catalyst and the resulting yields are poor, i.e. 14 or 32% of theoretical (compare Ch. R. Hauser and J. T. Adams, J.A.C.S. 64, 728 (1942); J. T. Adams and Ch. R. Hauser, J.A.C.S. 65, 552 (1943)).

The process of the present invention also provides the further advantage that by oxidation of compounds of formula I above, it is possible to prepare quinolines with any desired aromatic substituent $R^3$ in the 4-position, which are not obtainable by the initially mentioned Friedländer synthesis:

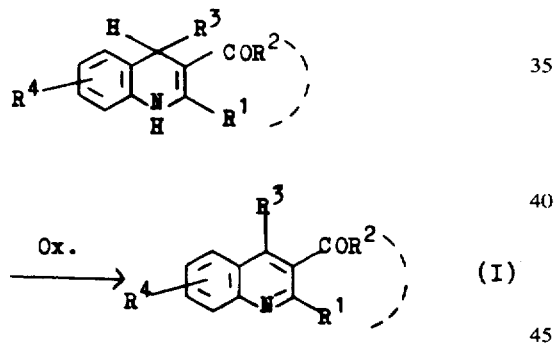

A further advantage of the process of the present invention is that it is a one-stage process and thus produces high yields and products of a high degree of purity in an economical manner in a technically simple process.

The reaction of the process of the present invention, when 2-aminobenzhydrol and acetoacetic acid methyl ester are used as reactants, is illustrated by the following equation:

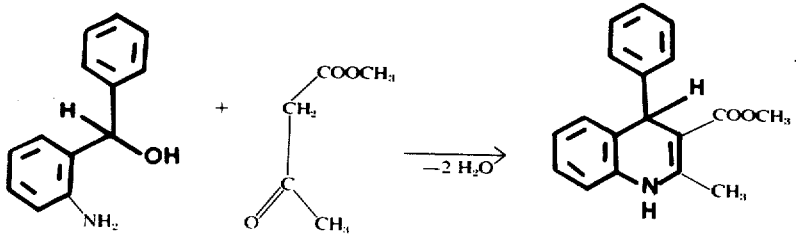

According to one embodiment of the present invention:

$R^2$ is straight or branched chain alkyl of 1 to 4 carbon atoms; or —OR' wherein R' is straight or branched chain alkyl of 1 to 4 carbon atoms or straight or branched chain alkenyl of 2 to 4 carbon atoms.

According to another embodiment of the present invention:

$R^3$ is phenyl unsubstituted or substituted by alkyl of 1 to 4 carbon atoms, alkoxy of 1 to 4 carbon atoms, phenyl, halogen, nitro, cyano, trifluoromethyl, or alkylmercapto of 1 to 4 carbon atoms; naphthyl; thenyl; or furyl.

According to another embodiment of the present invention:

$R^1$ is straight or branched chain alkyl of 1 to 3 carbon atoms;

$R^2$ is straight or branched chain alkyl of 1 to 3 carbon atoms, straight or branched chain alkoxy of 1 to 4 carbon atoms, or straight or branched chain alkenoxy of 2 to 4 carbon atoms; or $R^1$ and $R^2$ are linked together to form a ring having 5 or 6 carbon atoms, said carbon atoms including the 2 carbon atoms of the pyridyl moiety and the carbon atom of the carbonyl group attached to $R^2$;

$R^3$ is phenyl unsubstituted or substituted by 1 or 2 substituents selected from the group consisting of alkyl of 1 to 4 carbon atoms, alkoxy of 1 to 4 carbon atoms, phenyl, halogen, nitro, cyano, trifluoromethyl and alkylmercapto of 1 to 4 carbon atoms in the alkyl moiety; naphthyl; thenyl; or furyl; and $R^4$ is hydrogen, halogen, alkyl of 1 to 4 carbon atoms, or alkoxy of 1 to 4 carbon atoms.

According to another embodiment of the present invention:

$R^1$ is straight or branched chain alkyl of 1 to 3 carbon atoms;

$R^2$ is straight or branched chain alkyl of 1 to 3 carbon atoms, straight or branched chain alkoxy of 1 to 4 carbon atoms, or straight or branched chain alkenoxy of 2 to 4 carbon atoms; or $R^1$ and $R^2$ are linked together to form a ring having 6 carbon atoms, said carbon atoms including the 2 carbon atoms of the pyridyl moiety and the carbon atom of the carbonyl group attached to $R^2$;

$R^3$ is phenyl unsubstituted or substituted by alkyl of 1 or 2 carbon atoms, alkoxy of 1 or 2 carbon atoms, phenyl, fluorine, chlorine, nitro, cyano, trifluoromethyl, or alkylmercapto of 1 to 2 carbon atoms in the alkyl moiety; naphthyl; thenyl; or furyl; and $R^4$ is hydrogen, chlorine, fluorine, bromine, alkyl of 1 or 2 carbon atoms, or alkoxy of 1 or 2 carbon atoms.

According to another embodiment of the present invention:

$R^1$ is alkyl of 1 or 2 carbon atoms;

$R^2$ is alkoxy of 1 or 2 carbon atoms; or $R^1$ and $R^2$ are linked together to form a ring system having 6 to 10 carbon atoms or a ring system having 10 carbon atoms and 1 oxygen atom, said 6 to 10 carbon atoms including the 2 carbon atoms of the pyridyl moiety and the carbon atom of the carbonyl group attached to $R^2$;

$R^3$ is phenyl, phenyl substituted by alkyl of 1 or 2 carbon atoms, fluorine, chlorine or trifluoromethyl; or thenyl; and $R^4$ is hydrogen.

According to another embodiment of the present invention:

$R^1$ is methyl;

$R^2$ is methoxy; or $R^1$ and $R^2$ are linked together to form a ring containing 6 carbon atoms including the 2 carbon atoms of the pyridyl moiety and the carbon atom of the carbonyl group attached to $R^2$, or a spiro ring system of 10 carbon atoms and 1 oxygen atom including the 2 carbon atoms of the pyridyl ring and the carbon atom of the carbonyl group attached to $R^2$;

$R^3$ is phenyl, tolyl, or thenyl; and $R^4$ is hydrogen.

The aminobenzyl alcohols (II) which are used in the process according to the invention are already known or can be prepared according to known methods (compare F. Ullmann and H. Bleier, Ber. dtsch. chem. Ges. 35, 4273 (1902); E. Testa, L. Fontanella and M. Bovara, Farmaco Ed. Sci, 18, 815 (1963); S. Gabriel, Ber. dtsch. chem. Ges. 29, 1304 (1896)).

Representative aminobenzyl alcohols (II) which may be used as reactants in the process of the present invention include:

2-aminobenzhydrol, 2-aminophenyl-2'-,3'- and 4'-methylphenylcarbinols, 2-aminophenyl-2'-,3'- and 4'-methoxyphenylcarbinols, 2-aminophenyl-phenyl-2'-, 3'- and 4'-chlorophenylcarbinols, 2-aminophenyl-2'-nitrophenylcarbinol, 2-aminophenyl-4'-methylmercaptophenylcarbinol, 2-aminophenyl-3'-cyanophenylcarbinol, 2-aminophenyl-2'-trifluoromethylphenylcarbinol, 2-aminophenylnaphthyl(-1'- or 2'-)carbinol, 2-aminophenylfuryl(-2')carbinol, 2-aminophenylthenyl(-2')-carbinol, 5-chloro-2-aminobenzhydrol, 5-methoxy-2-aminobenzhydrol, 4,5-dimethyl-2-aminobenzhydrol, 2-aminophenyl-3' and -4'-dichlorophenylcarbinols, and 2-aminophenyl-biphenyl(4')-carbinol.

The β-dicarbonyl compounds (III) used in the process according to the present invention are already known or can be prepared by known processes (Pohl and Schmidt, U.S. Patent 2,351,366 (1940); reviewed in C.A. 1944, 5224; H. Stetter et al. Ann. 605, 61 (1957); B. Eistert et al. Ann. 681, 123 (1965)).

β-dicarbonyl compounds (III) representative of those which may be used according to the process of the present invention include:

acetylacetone,
heptane-3,5-dione,
acetoacetic acid methyl ester,
acetoacetic acid ethyl ester,
acetoacetic acid isopropyl ester,
acetoacetic acid n-butyl ester,
acetoacetic acid allyl ester,
acetoacetic acid propargyl ester,
propionylacetic acid ethyl ester,
isobutyrylacetic acid methyl ester,
cyclopentane-1,3-dione,
cyclohexane-1,3-dione,
cycloheptane-1,3-dione,
5,5-dimethylcyclohexane-1,3-dione,
6-methylpyrane-2,4-dione, and
6,6-pentamethylene-pyrane-2,4-dione.

Any inert organic solvent or mixture of such solvents can be used as a solvent. Preferred solvents for use in the process of the present invention are acids (such as acetic acid and propionic acid), alcohols (such as ethanol and propanol), and acetonitrile, dimethylsulphoxide or dimethylformamide.

The reaction temperatures can be varied over a substantial range. In general, the reaction is carried out at between 20°C and 200°C, preferably between 50°C and 150°C, and especially at the boiling point of the solvent.

The reaction can be carried out either under atmospheric pressure or elevated pressure. In general, atmospheric pressure is used.

In carrying out the process according to the present invention, the substances participating in the reaction are generally each employed in substantially molar amounts.

Based on animal experiments, the following pharmaceutical activities are demonstrable:

1. On parenteral, oral and perlingual administration the new compounds produce a distinct and long-lasting dilation of the coronary vessels. This action on the coronary vessels is intensified by a simultaneous nitrite-like effect of reducing the load on the heart. They influence or modify the heart metabolism in the sense of an energy saving.

2. The compounds lower the blood pressure of normotonic and hypertonic animals and can thus be used as antihypertensive agents.

3. The excitability of the stimulus formation and excitation conduction system within the heart is lowered, so that an anti-fibrillation action demonstrable at therapeutic dose results.

4. The tone of the smooth muscle of the vessels is greatly reduced under the action of the compounds. This vascular-spasmolytic action can take place throughout the entire vascular system or can manifest itself more or less isolated in circumscribed vascular regions (such as, for example, the central nervous system).

5. The compounds have strongly muscular-spasmolytic actions which manifest themselves on the smooth muscle of the stomach, the intestinal tract, the urogenital tract and the respiratory system.

6. The compounds influence the cholesterol level and lipid level of the blood.

For example, the compound from Example 1 (below) produces a distinctly detectable rise in the oxygen saturation in the coronary sinus in narcotized heart-catheterized mongrel dogs on intravenous administration of 1 mg or more per kg body weight, and has an antihypertensive effect (blood pressure lowering of more than 15 mm Hg) in rats suffering from experimentally-induced high blood pressure, on oral administration of 10 mg or more per kg body weight.

The pharmaceutical compositions of the present invention contain a major or minor amount e.g. 99.5% to 0.1%, preferably 95% to 0.5% of at least one 1,4-dihydroquinoline as above defined in combination with a pharmaceutically acceptable nontoxic, inert diluent or carrier, the carrier comprising one or more solid, semi-solid or liquid diluent, filler and formulation adjuvant which is nontoxic, inert and pharmaceutically acceptable. Such pharmaceutical compositions are preferably in dosage unit form; i.e., physically discrete units containing a predetermined amount of the drug corresponding to a fraction or multiple of the dose which is calculated to produce the desired therapeutic response. The dosage units can contain one, two, three, four or more single doses or, alternatively, one-half, third or fourth of a single dose. A single dose preferably contains an amount sufficient to produce the desired therapeutic effect upon administration at one application of one or more dosage units according to a predetermined dosage regimen, usually a whole, half, third or quarter of the daily dosage administered once, twice, three or four times a day. Other therapeutic agents can also be present.

Although the dosage and dosage regimen must in each case be carefully adjusted, utilizing sound professional judgment and considering the age, weight and condition of the recipient, the route of administration and the nature and gravity of the illness, generally the dosage administered intravenously will be from 0.1 to 50 mg/kg, preferably 0.5 to 10 mg/kg of body weight per day, and the dosage administered orally will be from 1 to 100 mg/kg, preferably 10 to 50 mg/kg of body weight per day. In some instances a sufficient therapeutic effect can be obtained at a lower dose while in others, a larger dose will be required.

Oral administration can be effected utilizing solid and liquid dosage unit forms such as powders, tablets, dragees, capsules, granulates, suspensions, solutions and the like.

Powders are prepared by comminuting the compound to a suitable fine size and mixing with a similarly comminuted pharmaceutical carrier such as an edible carbohydrate as for example starch, lactose, sucrose, glucose or mannitol. Sweetening, flavoring, preservative, dispersing and coloring agents can also be present.

Capsules are made by preparing a powder mixture as described above and filling formed gelatin sheaths. Glidants and lubricants such as colloidal silica, talc, magnesium stearate, calcium stearate or solid polyethylene glycol can be added to the powder mixture before the filling operation. A disintegrating or solubilizing agent such as agar-agar, calcium carbonate or sodium carbonate can also be added to improve the availability of the medicament when the capsule is ingested.

Tablets are formulated for example by preparing a powder mixture, granulating or slugging, adding a lubricant and disintegrant and pressing into tablets. A powder mixture is prepared by mixing the compound, suitably comminuted, with a diluent or base as described above, and optionally with a binder such as carboxymethyl, cellulose, and alginate, gelatin, or polyvinyl pyrrolidone, a solution retardant such as paraffin, a resorption accelerator such as a quaternary salt and-/or an absorption agent such as bentonite, kaolin or dicalcium phosphate. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A clear or opaque protective coating consisting of a sealing coat of shellac, a coating of sugar or polymeric material and a polish coating of wax can be provided. Dyestuffs can be added to these coatings to distinguish different unit dosages.

Oral fluids such as solutions, syrups and elixirs can be prepared in dosage unit form so that a given quantity contains a predetermined amount of the compound. Syrups can be prepared by dissolving the compound in a suitably flavored aqueous sucrose solution while elixirs are prepared through the use of a nontoxic alcoholic vehicle. Suspensions can be formulated by dispersing the compound in a nontoxic vehicle. Solubilizers and emulsifiers such as ethoxylated isostearyl alcohols and polyoxyethylene sorbitol esters, preservatives, flavor additives such as peppermint oil or saccharin, and the like can also be added.

Where appropriate, dosage unit formulations for oral administration can be microencapsulated. The formulation can also be prepared to prolong or sustain the release as for example by coating or embedding particulate material in polymers, wax or the like.

Parenteral administration can be effected utilizing liquid dosage unit forms such as sterile solutions and suspensions intended for subcutaneous, intramuscular or intravenous injection. These are prepared by suspending or dissolving a measured amount of the compound in a nontoxic liquid vehicle suitable for injection such as an aqueous or oleaginous medium and sterilizing the suspension or solution. Alternatively, a measured amount of the compound is placed in a vial and the vial and its contents are sterilized and sealed. An accompanying vial or vehicle can be provided for mixing prior to administration. Nontoxic salts and salt solutions can be added to render the injection isotonic. Stabilizers, preservatives and emulsifiers can also be added.

Rectal administration can be effected utilizing suppositories in which the compound is admixed with low melting water soluble or insoluble solids such as polyethylene glycol, cocoa butter, higher esters as for example myristyl palmitate, or mixtures thereof.

Topical administration can be effected utilizing solid dosage unit forms such as powders or liquid or semiliquid dosage unit forms such as solutions, suspensions, ointments, pastes, creams and gels. The powders are formulated utilizing such carriers as talc, bentonite, silicic acid, polyamide powder and the like. Liquid and semiliquid formulations can utilize such carriers, in addition to those described above, as polyethylene glycol, vegetable and mineral oils, alcohols such as isopropanol and the like. Other excipients such as emulsifiers, preservatives, colorants, perfumes and the like can also be present. Formulations can also be administered as an aerosol, utilizing the usual propellants such as the chlorofluorohydrocarbons.

The preferred daily dose for intravenous administration is 5 mg to 5 g, preferably 25 mg to 1 g of active agent; and the preferred daily dose for oral administration is 50 mg to 10 g, preferably 500 mg to 5 g of active agent.

While the routes of administration include oral, parenteral (i.e., intramuscular, intraperitoneal, and intravenous), rectal, and topical, oral and intravenous administrations are particularly preferred.

The following non-limitative examples more particularly illustrate the present invention:

EXAMPLE 1

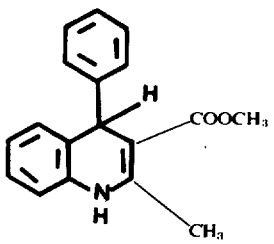

Boiling a solution of 7.9 g of 2-aminobenzhydrol and 4.6 g of acetoacetic acid methyl ester in 50 ml of glacial acetic acid (6 hours) gave 2-methyl-4-phenyl-1,4-dihydroquinoline-b 3-carboxylic acid methyl ester of melting point 188°C.
Yield: 53% of theory.

EXAMPLE 2

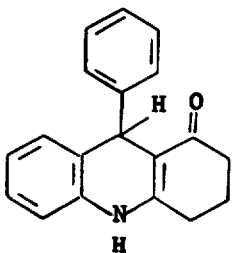

Boiling a solution of 7.9 g of 2-aminobenzhydrol and 4 g of cyclohexane-1,3-dione in 80 ml of glacial acetic acid for 6 hours gave 9-phenyl-1-oxo-1,2,3,4,9,10-hexahydroacridine of melting point 295°-7° (glacial acetic acid).
Yield: 63% of theory.

EXAMPLE 3

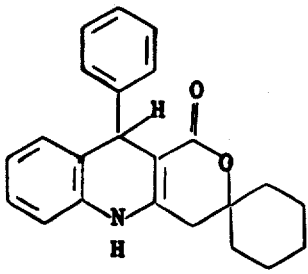

Boiling a solution of 9.7 g of 2-aminobenzhydrol and 8.9 g of 6,6-pentamethylene-pyrane-2,4-dione in 60 ml of glacial acetic acid for 6 hours gave 4-phenyl-7,7-pentamethylene-5-oxo-2,3-benzo-1,4-dihydro-7H-pyrano-[4,3-b] pyridine of melting point 244°C (glacial acetic acid).
Yield: 56% of theory.

EXAMPLE 4

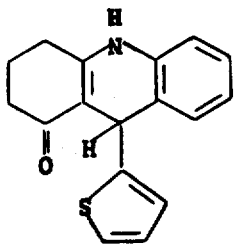

Boiling a solution of 10.2 g of 2-aminophenylthenyl (-2')-carbinol and 5.8 g of cyclohexane-1,3-dione in 100 ml of glacial acetic acid for 6 hours gave 9-thenyl(-2')-1-oxo-1,2,3,4,9,10-hexahydroacridine of melting point 266°C (glacial acetic acid).
Yield: 67% of theory.

EXAMPLE 5

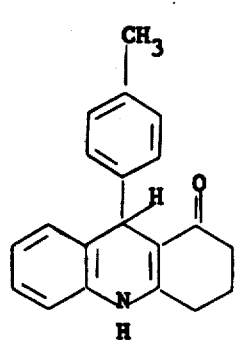

Boiling a solution of 8.6 g of 2-amino-4'-methylbenzhydrol and 4.5 g of cyclohexane-1,3-dione in 50 ml of acetic acid for 6 hours gave 9-(4'-methylphenyl)-1-oxo-1,2,3,4,9,10-hexahydroacridine of melting point 243°C (ethanol).
Yield: 55% of theory,

What is claimed is:

1. A compound of the formula:

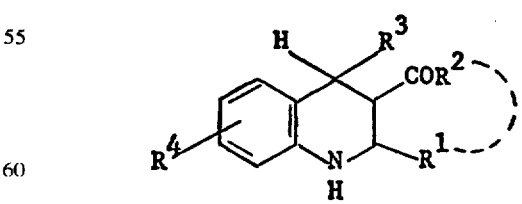

wherein
$R^1$ and $R^2$ are linked together to form a ring having 6 carbon atoms, said carbon atoms including the carbon atom of the pyridyl moiety and the carbon atom of the carbonyl group attached to $R^2$;

R³ is phenyl unsubstituted or substituted by 1 substituents selected from the group consisting of alkyl of 1 to 4 carbon atoms, alkoxy of 1 to 4 carbon atoms, phenyl, nitro, cyano, trifluoromethyl and alkylmercapto of 1 to 4 carbon atoms in the alkyl moiety or by di-halo or dimethyl; naphthyl; thenyl; or furyl; and R⁴ is hydrogen, halogen, alkyl of 1 to 4 carbon atoms, or alkoxy of 1 to 4 carbon atoms.

2. A compound according to claim 1 wherein
R³ is phenyl unsubstituted or monosubstituted by alkyl of 1 to 4 carbon atoms, alkoxy of 1 to 4 carbon atoms, phenyl, halogen, nitro, cyano, trifluoromethyl, or alkylmercapto of 1 to 4 carbon atoms; naphthyl; thenyl; or furyl.

3. A compound according to claim 1 wherein
R¹ and R² are linked together to form a ring having 6 carbon atoms, said carbon atoms including the carbon atom of the pyridyl moiety and the carbon atom of the carbonyl group attached to R²;
R³ is phenyl unsubstituted or monosubstituted by alkyl of 1 or 2 carbon atoms, alkoxy of 1 to 2 carbon atoms, phenyl, fluorine, chlorine, nitro, cyano, trifluoromethyl, or alkylmercapto of 1 to 2 carbon atoms in the alkyl moiety; naphthyl; thenyl; or furyl; and
R⁴ is hydrogen, chlorine, fluorine, bromine, alkyl of 1 or 2 carbon atoms, or alkoxy of 1 or 2 carbon atoms.

4. A compound according to claim 1 wherein
R³ is phenyl, phenyl monosubstituted by alkyl of 1 or 2 carbon atoms, fluorine, chlorine or trifluoromethyl; or thenyl; and
R⁴ is hydrogen.

5. A compound according to claim 1 wherein
R¹ and R² are linked together to form a ring containing 6 carbon atoms including the carbon atom of the pyridyl moiety and the carbon atom of the carbonyl group attached to R²;
R³ is phenyl, tolyl, or thenyl; and
R⁴ is hydrogen.

6. The compound according to claim 1 which is

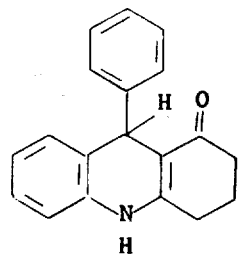

7. The compound according to claim 1 which is

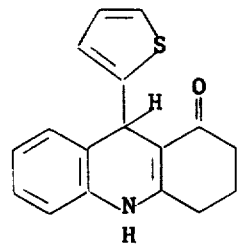

8. The compound according to claim 1 which is

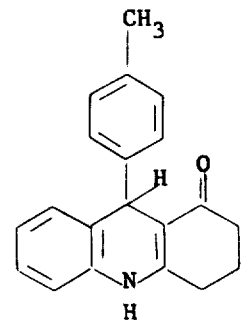

* * * * *